(12) United States Patent
Xue

(10) Patent No.: US 8,243,434 B2
(45) Date of Patent: Aug. 14, 2012

(54) ELECTRONIC DEVICE ENCLOSURE

(75) Inventor: Yuan Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/882,578

(22) Filed: Sep. 15, 2010

(65) Prior Publication Data

US 2011/0192742 A1    Aug. 11, 2011

(30) Foreign Application Priority Data

Feb. 5, 2010    (CN) ...................... 2010 2 0302421 U

(51) Int. Cl.
*H05K 7/00* (2006.01)

(52) U.S. Cl. ......... 361/679.33; 361/679.36; 361/679.37; 361/679.49; 361/679.51; 361/695; 174/252; 174/520; 454/184; 312/223.2

(58) Field of Classification Search ............ 361/679.32–679.39, 679.46, 679.48, 679.49, 679.51, 679.57, 361/692, 694, 695

See application file for complete search history.

(56) References Cited

U.S. PATENT DOCUMENTS

| | | | |
|---|---|---|---|
| 6,678,157 B1 * | 1/2004 | Bestwick ....................... | 361/695 |
| 6,822,863 B1 * | 11/2004 | Artman et al. ................ | 361/695 |
| 7,403,387 B2 * | 7/2008 | Pav et al. ..................... | 361/694 |
| 7,535,709 B2 * | 5/2009 | Fan et al. ...................... | 361/695 |
| 7,612,996 B2 * | 11/2009 | Atkins et al. .............. | 361/679.51 |
| 2004/0196629 A1 * | 10/2004 | Broder et al. ................. | 361/695 |
| 2005/0063156 A1 * | 3/2005 | Olesiewicz et al. ........... | 361/695 |
| 2005/0219809 A1 * | 10/2005 | Muncaster et al. ........... | 361/685 |
| 2007/0253157 A1 * | 11/2007 | Atkins et al. ................. | 361/685 |

* cited by examiner

*Primary Examiner* — Courtney Smith
(74) *Attorney, Agent, or Firm* — Altis Law Group, Inc.

(57) ABSTRACT

An electronic device enclosure includes a chassis, a drive bracket, and an air duct. The drive bracket is secured to the chassis and defines a subspace for receiving a disk drive. The air duct is rotatably secured to the drive bracket, and rotatable between a first position, where the subspace is exposed, and a second position, where the subspace is covered by the air duct.

16 Claims, 8 Drawing Sheets

ELECTRONIC DEVICE ENCLOSURE

BACKGROUND

1. Technical Field

The present disclosure relates to an electronic device enclosure with an air duct.

2. Description of Related Art

In a computer system, a disk drive, such as a hard disk drive, is needed for storing data. The cooling efficiency of the disk drive is low because it is hard to make air flow about the disk drive, therefore there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
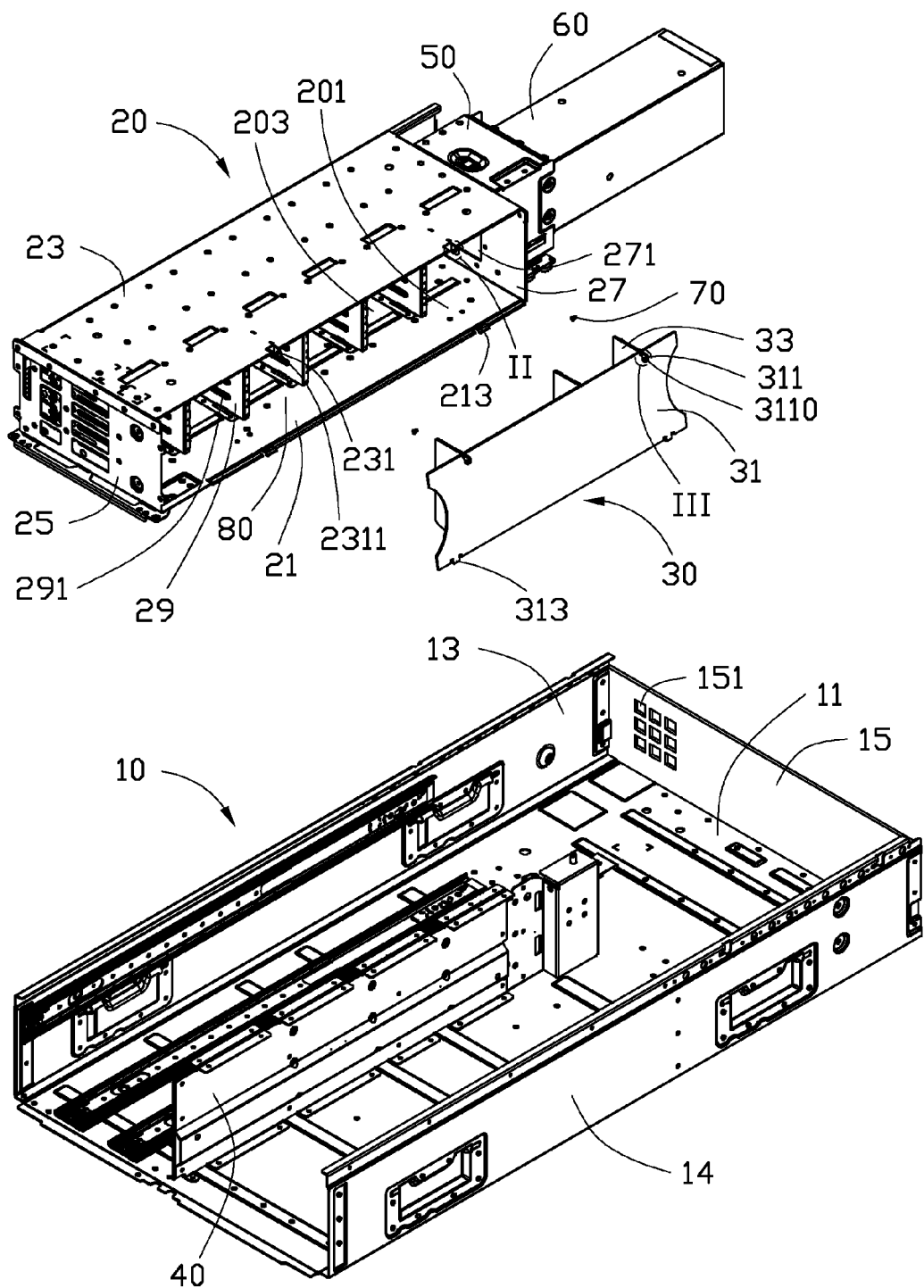
FIG. 1 is an exploded view of an electronic device in accordance with an embodiment.

Referring to FIG. 1, an electronic device enclosure, in accordance with an embodiment, includes a chassis 10, a drive bracket 20 and an air duct 30.

The chassis 10 includes a bottom plate 11, a first side plate 13, a second side plate 14, and a rear plate 15. The first and second side plates 13, 14 are located on two opposite edges of the bottom plate 11. The rear plate 15 is connected to the first and second side plates 13, 14. An intermediate plate 40 is located on the bottom plate 11 between the first and second side plates 13, 14. A number of ventilation holes 151 adjacent the first side plate 13 are defined in the rear plate 15. In an embodiment, the first and second side plates 13, 14 are substantially parallel to each other and substantially perpendicular to the bottom plate 11 and the rear plate 15, and the rear plate 15 is substantially perpendicular to the bottom plate 11.

The drive bracket 20 includes a bottom wall 21, a top wall 23, a first sidewall 25, and a second sidewall 27. The bottom wall 21 and the top wall 23 are connected by the first and second sidewalls 25, 27. The bottom wall 21, the top wall 23, and the first and second sidewalls 25, 27 define a space 201. A number of separating walls 29 are located both between the bottom wall 21 and the top wall 23 and between the first and second sidewalls 25, 27, to divide the space 201 into a number of subspaces 203. The separating walls 29 are smaller than the first and second sidewalls 25, 27. Each subspace 203 is configured to receive a disk drive, such as a hard disk drive. In an embodiment, the top wall 23 is substantially parallel to the bottom wall 21 and substantially perpendicular to the first and second sidewalls 25, 27, and the first and second sidewalls 25, 27 are substantially parallel to each other.

Figure 2:
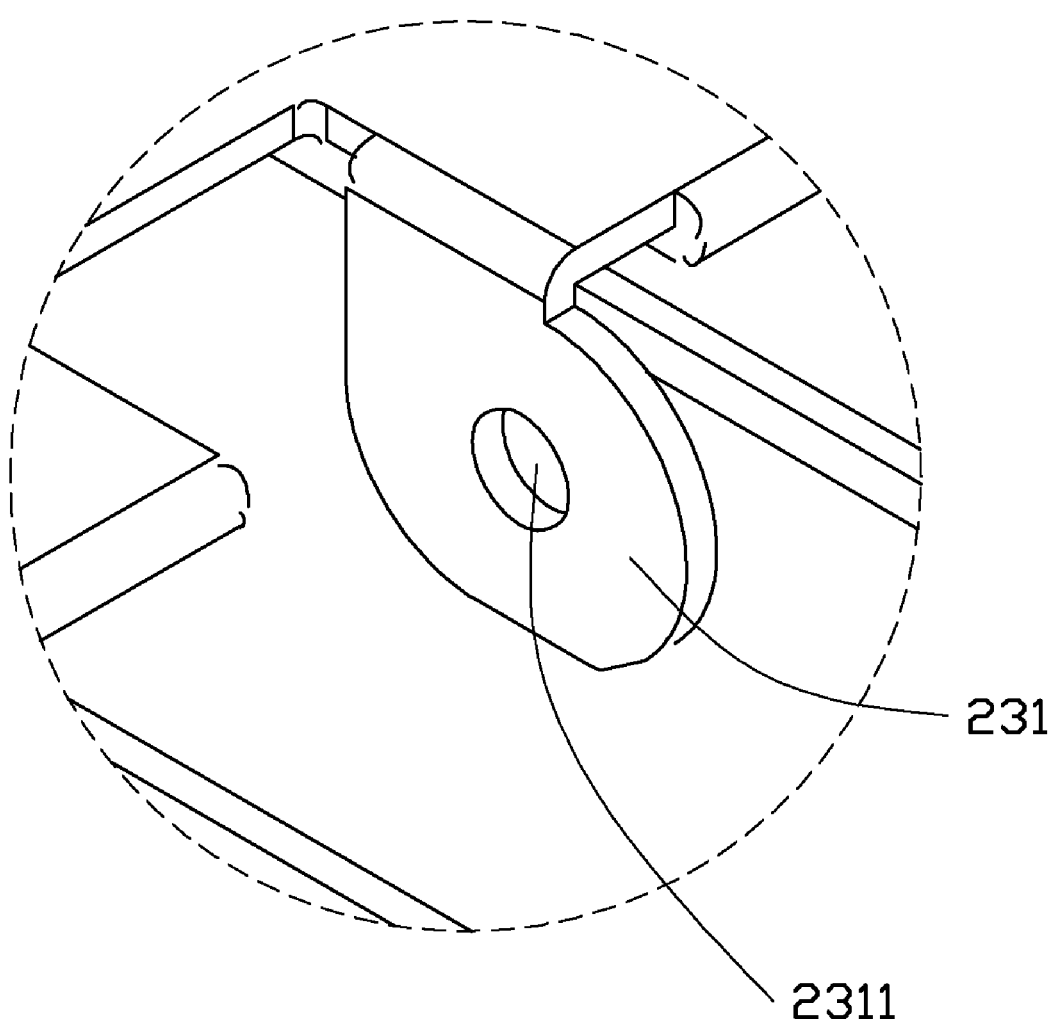
FIG. 2 is an enlarged view of portion II of FIG. 1.

Two resiliently distortable locking pieces 213 are located on an edge of the bottom wall 21. A locking hole 2131 (shown in FIG. 4) is defined in each locking piece 213. Two first pivot pieces 231 are located on an edge of the top wall 23, corresponding to the locking pieces 213. Referring to FIG. 2, a first pivot hole 2311 is defined in each first pivot piece 231. A number of first through openings 251 is the first sidewall 25. A second through opening 271 is defined in the second sidewall 27. A number of third through openings 291 is defined in each separating wall 29.

Figure 3:
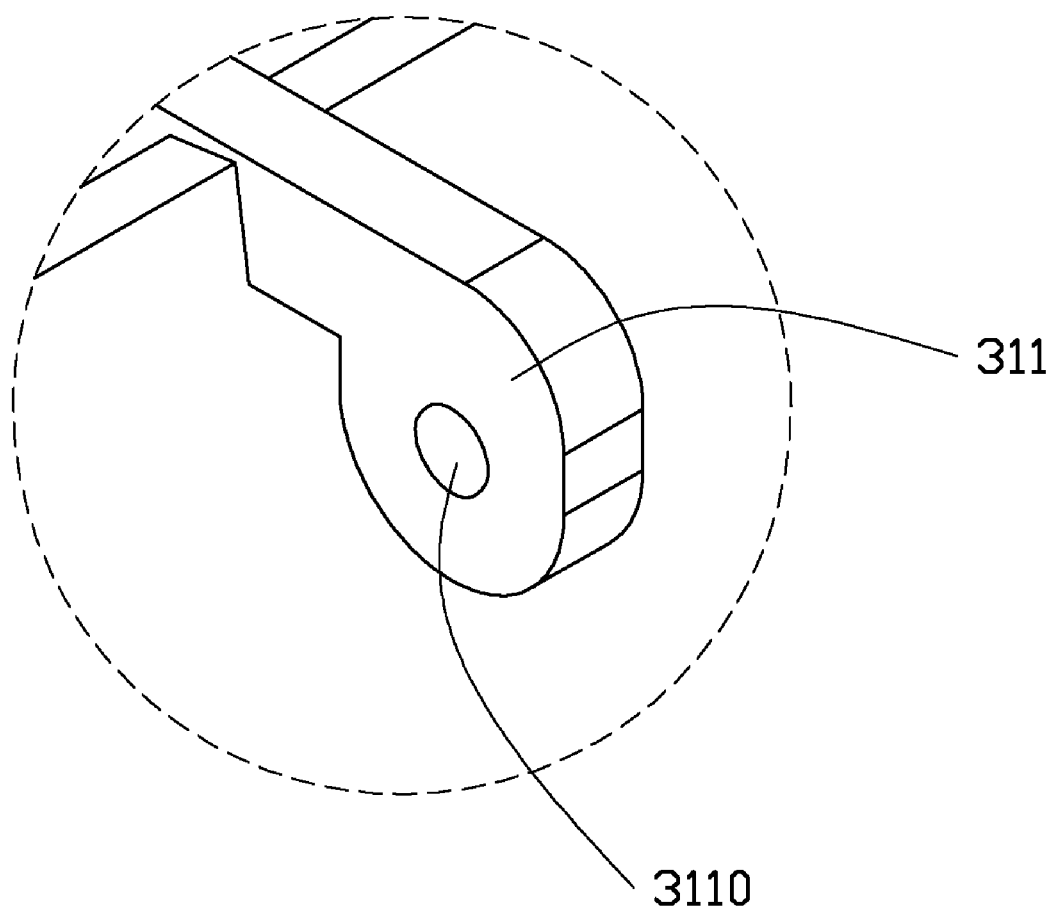
FIG. 3 is an enlarged view of portion III of FIG. 1.

The air duct 30 includes a base board 31 and a number of shielding boards 33. Referring FIG. 3, two second pivot pieces 311 are located on a top edge of the base board 31, corresponding to the first pivot pieces 231 of the drive bracket 20. A second pivot hole 3110 is defined in each second pivot piece 311. Two locking tabs 313 are located on a bottom edge of the base board 31, for engaging in the locking holes 2131 of the drive bracket 20. A distance between two adjacent shielding boards 33 is generally equal to a distance between two adjacent separating walls 29. In an embodiment, the shielding boards 33 are substantially perpendicular to the base board 31.

Figure 4:
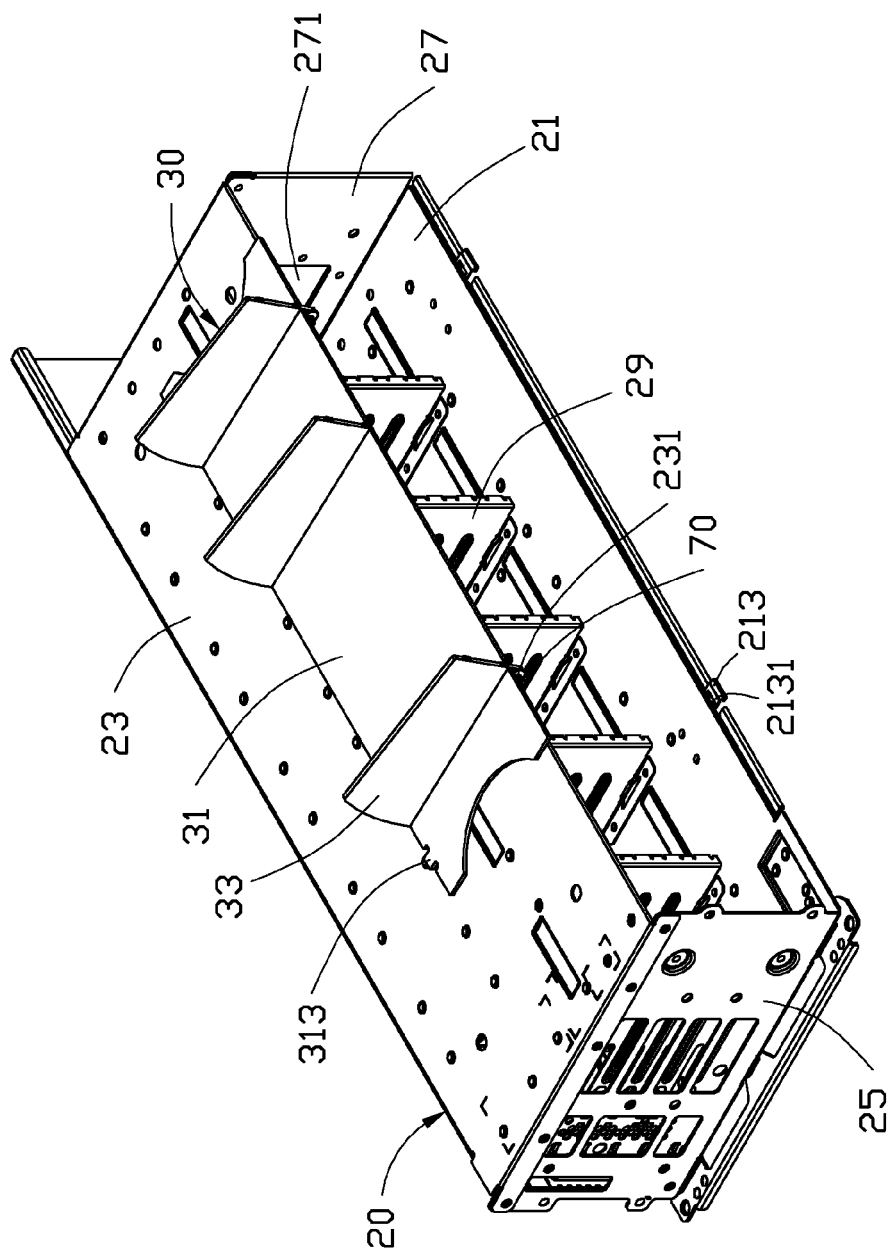
FIG. 4 is an assembled view of a drive bracket and an air cut of FIG. 1.
Figure 5:
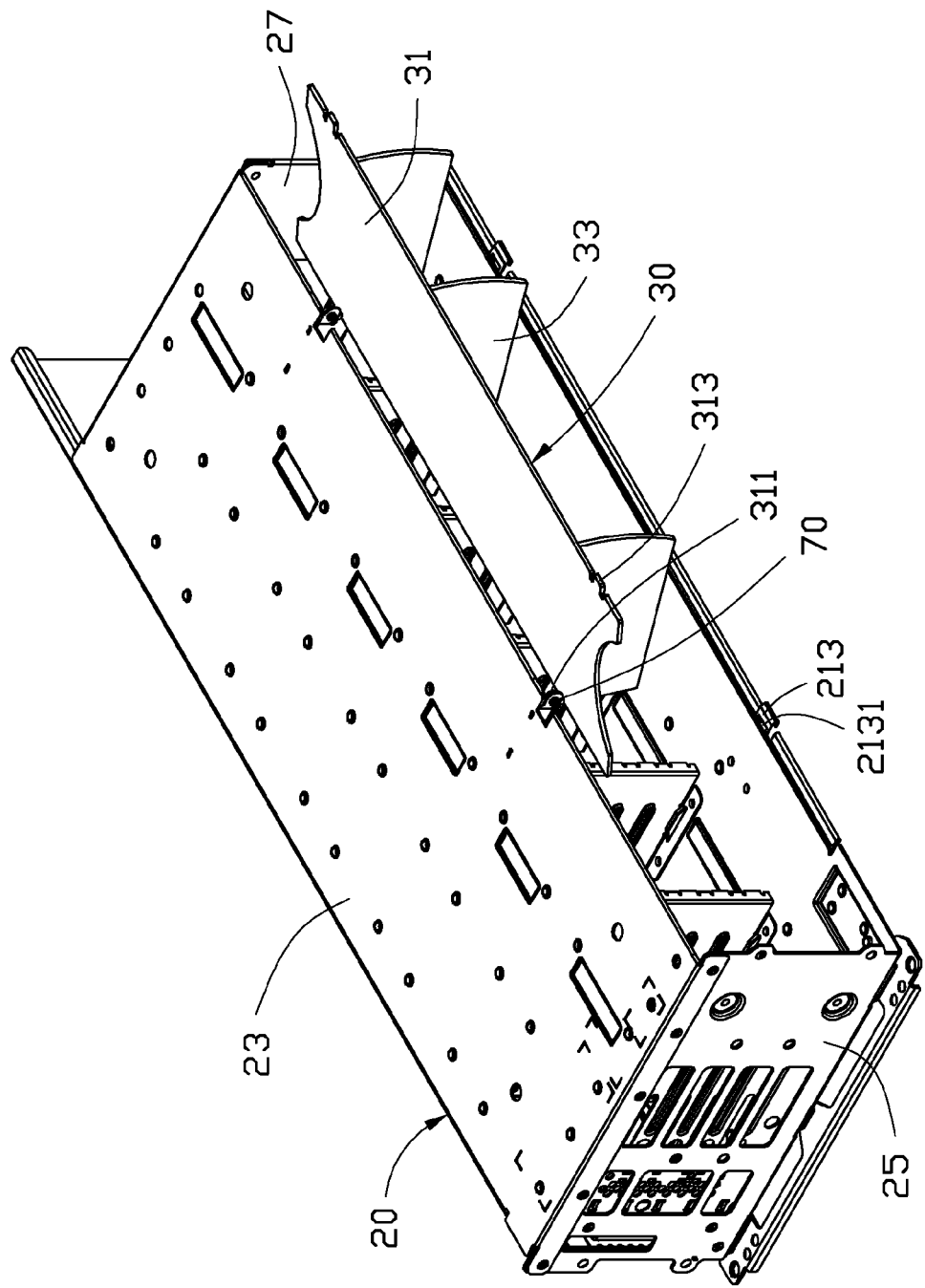
FIG. 5 is similar to FIG. 4, but shows the air duct in a second position.
Figure 6:
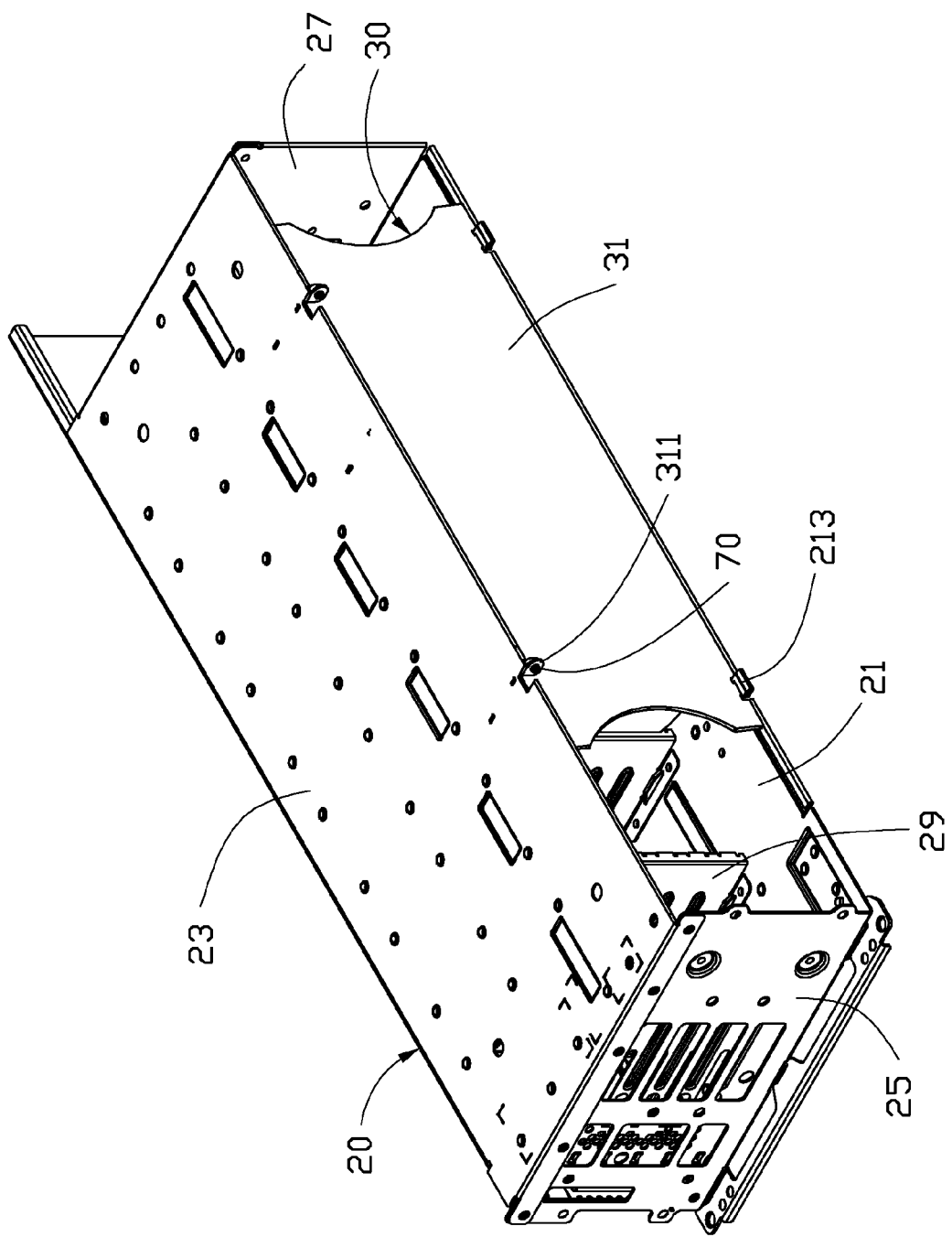
FIG. 6 is similar to FIG. 5, but shows the air duct in a third position.

Referring to FIGS. 4-6, the air duct 30 is attached to the drive bracket 20. The first pivot holes 2311 of the first pivot pieces 231 are aligned with the second pivot holes 3110 of the second pivot pieces 311. Two fasteners 70, such as screws, are engaged into the first and second pivot holes 2311 and 3110, to secure the air duct 30 to the drive bracket 20.

The air duct 30 can be rotated between a first position (shown in FIG. 4) and a second position (shown in FIG. 6). In the first position, the air duct 30 is rotated to position above the top wall 23, to uncover the subspace 203 of the drive bracket 20, and the locking tabs 313 are disengaged from the locking holes 2131 of the locking pieces 213. In the second position, the air duct 30 is rotated to cover the subspace 203 of the drive bracket 20. The locking tabs 313 are engaged in the locking holes 2131 of the locking pieces 213. The shielding boards 33 abut the separating walls 29 of the drive bracket 20, to prevent air flowing out of the subspace 203 in a direction substantially perpendicular to the base board 31.

Referring to FIG. 1, the electronic device enclosure in accordance with an embodiment further includes a first air guiding bracket 50 and a second air guiding bracket 60. The first air guiding bracket 50 is secured to the second sidewall 27 of the drive bracket 20, to enclose the second through opening 271 of the second sidewall 27. The second air guiding bracket 60 is secured to the first air guiding bracket 50 and attached to the rear plate 15 of the chassis 10, to enclose the ventilation holes 151 of the rear plate 15. The first and second air guiding brackets 50, 60 are configured for guiding air flowing from outside the chassis 10 to the drive bracket 20 via the ventilation holes 151 and the through opening 271.

Figure 7:
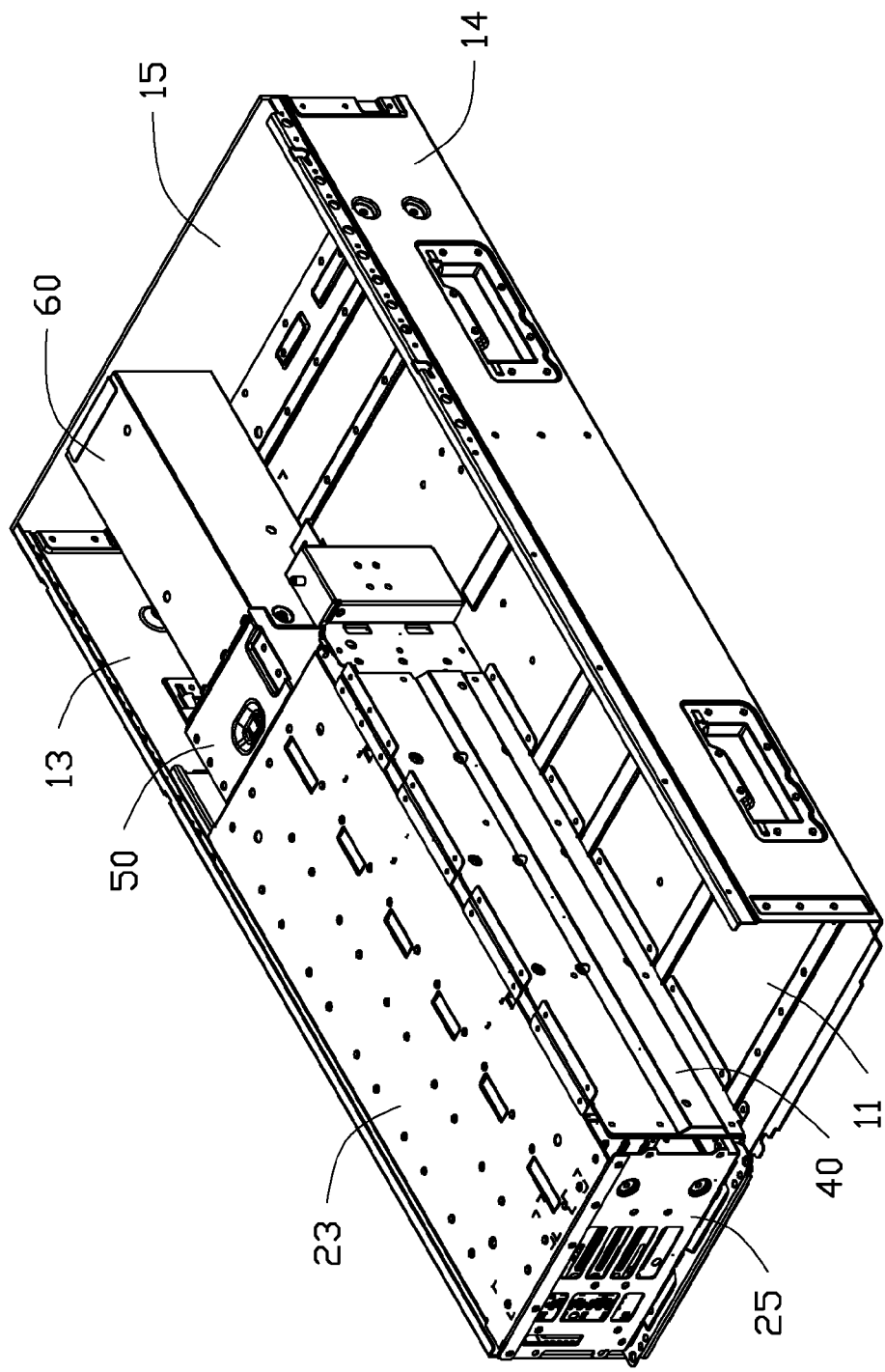
FIG. 7 is an assembled view of FIG. 1.
Figure 8:
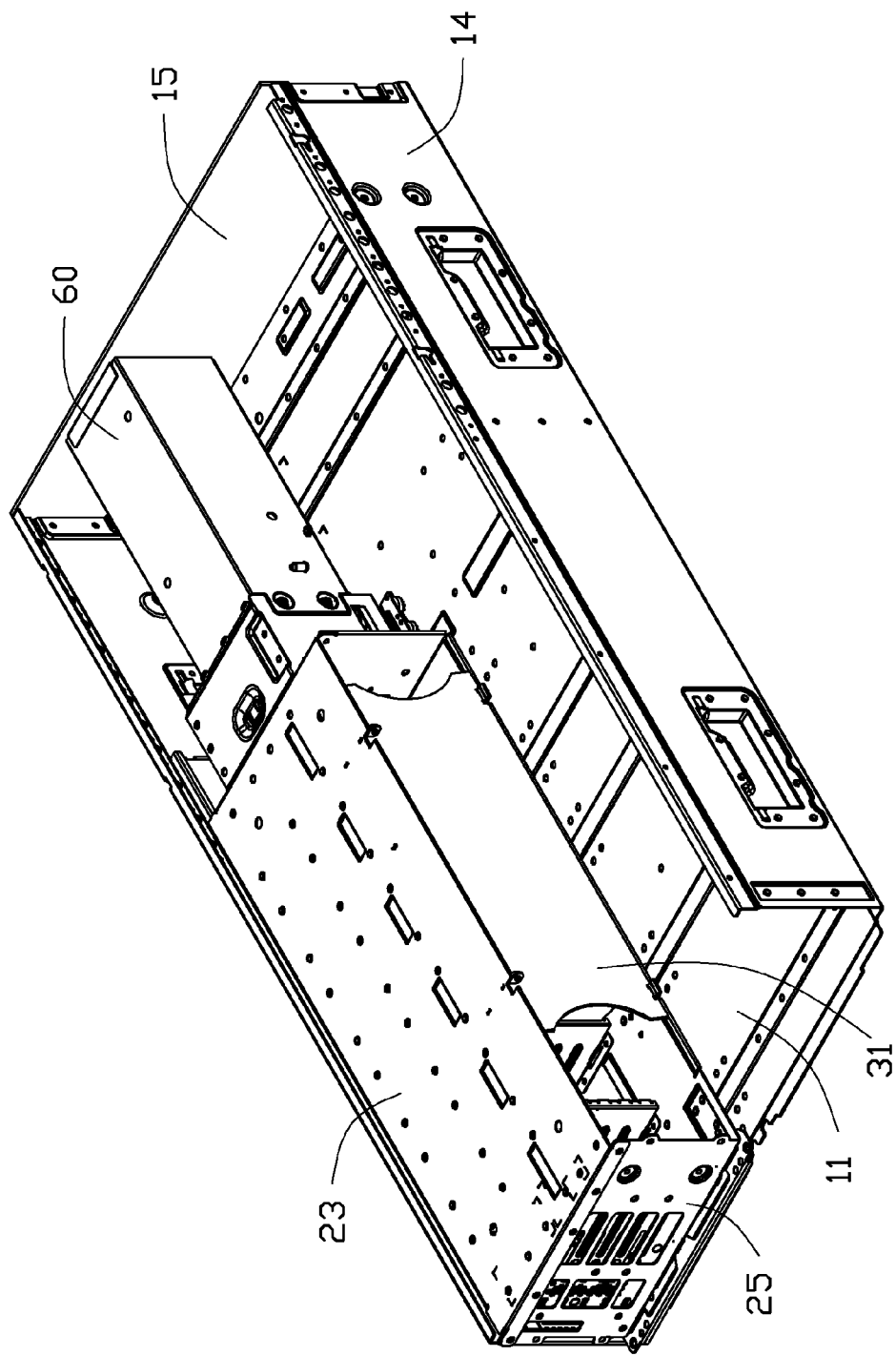
FIG. 8 is similar to FIG. 7, but does not show an intermediate plate of FIG. 1.

Referring to FIGS. 7 and 8, the air duct 30 is secured to the drive bracket 20 and positioned in the second position. The first and second air guiding bracket 50, 60 are secured to the drive bracket 20. The drive bracket 20 is secured to the bottom plate 11 of the chassis 10. The ventilation holes 151 of the rear plate 15 are enclosed by the second air guiding bracket 60.

In use, air flows in turn from outside of the chassis 10, through the ventilation holes 151, the second air guiding bracket 60, the first air guiding bracket 50, and the second through opening 271, to the drive bracket 20. Because the air duct 30 covers the subspace 203 of the drive bracket 20, the air flows through the third through opening 291 of the separating wall 29 and the first through opening 251 of the first sidewall 25. Thus, the disk drive secured to the subspace 203 of the drive bracket 20 can be cooled.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a chassis;
   a drive bracket secured to the chassis; and the drive bracket defining a subspace;
   at least one disk drive received in the subspace of the drive bracket; and
   an air duct rotatably secured to the drive bracket; wherein the air duct is rotatable between a first position, where the subspace is exposed, and a second position, where the subspace is covered by the air duct;
   wherein the drive bracket comprises a first sidewall and a second sidewall, the first sidewall defines a first through opening, and the second sidewall defines a second through opening; a plurality of separating walls is located in the drive bracket between the first and second sidewalls; and each of the plurality of separating walls defines a third through opening.

2. The electronic device enclosure of claim 1, wherein the first sidewall is substantially parallel to the second sidewall and the plurality of separating walls.

3. The electronic device enclosure of claim 1, wherein the subspace is defined between adjacent two of the first sidewall, the second sidewall and the plurality of separating walls.

4. The electronic device enclosure of claim 1, wherein the air duct comprises a base board and a plurality of shielding boards located on the base board; and when the air duct is in the first position, the plurality of shielding boards is spaced from the plurality of separating walls, and when the air duct is in the second position, the plurality of shielding boards abuts the plurality of separating walls.

5. The electronic device enclosure of claim 4, wherein the plurality of shielding boards are substantially perpendicular to the base board.

6. The electronic device enclosure of claim 1, wherein a first pivot piece is located on the drive bracket; a second pivot piece is located on the air duct; and the first pivot piece is rotatably secured to the second pivot piece.

7. The electronic device enclosure of claim 1, wherein a resiliently deformable locking piece is located on the drive bracket; a locking tab is located on the air duct; and when the air duct is in the first position, the locking tab is disengaged from the resiliently deformable locking piece, and when the air duct is in the second position, the locking tab is engaged with the resiliently deformable locking piece.

8. The electronic device enclosure of claim 1, wherein the chassis comprises a bottom plate and a rear plate; the drive bracket is secured to the bottom plate; the rear plate defines a ventilation hole; and an air guiding bracket is secured to the second sidewall and encloses the second through opening and the ventilation hole.

9. An electronic device enclosure comprising:
   a drive bracket comprising a bottom wall and a top wall opposite to the bottom wall;
   at least one disk received between the bottom wall and the top wall of the drive bracket; and
   an air duct rotatably secured to the top wall; wherein the air duct is rotatable between a first position, where the air duct is disengaged from the bottom wall, and a second position, where the air duct is engaged with the bottom wall;
   wherein the drive bracket further comprises a first sidewall and a second sidewall opposite to the first sidewall; the first and second sidewalls are located between the bottom wall and the top wall; the first sidewall defines a first through opening; and the second sidewall defines a second through opening; a plurality of separating walls is located in the drive bracket between the first and second sidewalls, and each of the plurality of separating walls defines a third through opening.

10. The electronic device enclosure of claim 9, wherein the first sidewall is substantially parallel to the second sidewall and the plurality of separating walls and perpendicular to the bottom wall and the top wall; and the top wall is substantially parallel to the bottom wall.

11. The electronic device enclosure of claim 9, wherein a subspace is defined between each adjacent two of the first sidewall, the second sidewall and one or two of the plurality of separating walls.

12. The electronic device enclosure of claim 9, wherein the air duct comprises a base board and a plurality of shielding boards located on the base board; and when the air duct is in the first position, the plurality of shielding boards is spaced from the plurality of separating walls, and when the air duct is in the second position, the plurality of shielding boards abuts the plurality of separating walls.

13. The electronic device enclosure of claim 12, wherein the plurality of shielding boards are substantially perpendicular to the base board.

14. The electronic device enclosure of claim 9, wherein a resiliently deformable locking piece is located on the bottom wall; a locking tab is located on the air duct; and when the air duct is in the first position, the locking tab is disengaged from the resiliently deformable locking piece, and when the air duct is in the second position, the locking tab is engaged with the resiliently deformable locking piece.

15. The electronic device enclosure of claim 9, further comprising a chassis, the chassis comprising a bottom plate and a rear plate; the drive bracket is secured to the bottom plate; the rear plate defining a ventilation hole; and an air guiding bracket is secured to the second sidewall and encloses the second through opening and the ventilation hole.

16. An electronic device enclosure comprising:
   a chassis;
   a drive bracket secured to the chassis; and the drive bracket defining a subspace for receiving a disk drive; and
   an air duct rotatably secured to the drive bracket; wherein the air duct is rotatable between a first position, where the subspace is exposed, and a second position, where the subspace is covered by the air duct;
   wherein a resiliently deformable locking piece is located on the drive bracket; a locking tab is located on the air duct; and when the air duct is in the first position, the locking tab is disengaged from the resiliently deformable locking piece, and when the air duct is in the second position, the locking tab is engaged with the resiliently deformable locking piece.

* * * * *